US009294399B2

(12) United States Patent
Tan et al.

(10) Patent No.: US 9,294,399 B2
(45) Date of Patent: Mar. 22, 2016

(54) METHOD FOR LEARNING MEDIA ACCESS CONTROL ADDRESS, NETWORK DEVICE, AND SYSTEM

(71) Applicant: HUAWEI TECHNOLOGIES CO., LTD., Shenzhen, Guangdong (CN)

(72) Inventors: Xijin Tan, Shenzhen (CN); Shulei Ma, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 14/041,154

(22) Filed: Sep. 30, 2013

(65) Prior Publication Data
US 2014/0029621 A1 Jan. 30, 2014

Related U.S. Application Data

(63) Continuation of application No. PCT/CN2012/073295, filed on Mar. 30, 2012.

(30) Foreign Application Priority Data

Mar. 30, 2011 (CN) .......................... 2011 1 0078367

(51) Int. Cl.
*H04L 12/28* (2006.01)
*H04L 12/56* (2006.01)
(Continued)

(52) U.S. Cl.
CPC .......... *H04L 45/745* (2013.01); *H04L 12/4641* (2013.01); *H04L 12/6418* (2013.01); *H04L 45/08* (2013.01); *H04L 45/7453* (2013.01)

(58) Field of Classification Search
CPC ..... H04L 45/745; H04L 45/453; H04L 45/08; H04L 12/6418; H04L 12/4641
See application file for complete search history.

(56) References Cited

U.S. PATENT DOCUMENTS 5,852,607 A 12/1998 Chin ............................ 370/401
7,286,528 B1 * 10/2007 Pannell ............... H04L 12/4625
370/389

(Continued)

FOREIGN PATENT DOCUMENTS

CN 1302645 2/2007
CN 1980180 A 6/2007

(Continued)

OTHER PUBLICATIONS

International Search Report, dated Jul. 5, 2012, in corresponding International Application No. PCT/CN2012/073295 (4 pages).

(Continued)

*Primary Examiner* — Lonnie Sweet
(74) *Attorney, Agent, or Firm* — Staas & Halsey LLP

(57) ABSTRACT

Embodiments of the present invention provide a method for learning a media access control address, a network device and a system. The method includes: generating a key value according to a key field of a received packet, and obtaining an index value corresponding to the key value according to the key value; performing a linear random iteration on the index value according to a preset number of iterations; searching, according to an iteration index value obtained during a first iteration, in a MAC address pool for a MAC address corresponding to the iteration index value obtained during the first iteration; and learning a MAC address of the packet according to a search result. By using the embodiments of the present invention a media access control address space may be fully utilized, and the problem of media access control address conflicts may be solved to the greatest extent.

11 Claims, 5 Drawing Sheets

(51) Int. Cl.
  *H04L 12/741* (2013.01)
  *H04L 12/64* (2006.01)
  *H04L 12/46* (2006.01)
  *H04L 12/751* (2013.01)
  *H04L 12/743* (2013.01)

(56) References Cited

U.S. PATENT DOCUMENTS

| | | | |
|---|---|---|---|
| 2002/0169937 A1* | 11/2002 | Kagawa | G06F 17/30949 711/206 |
| 2005/0286537 A1* | 12/2005 | Shimada | H04L 12/4645 370/395.53 |
| 2006/0039378 A1 | 2/2006 | Medina et al. | 370/382 |
| 2009/0262740 A1* | 10/2009 | Miyoshi | 370/392 |
| 2009/0282167 A1* | 11/2009 | Dai | 709/238 |

FOREIGN PATENT DOCUMENTS

| | | |
|---|---|---|
| CN | 100531097 | 8/2009 |
| GB | 2462493 | 2/2010 |
| WO | 2004/023732 A1 | 3/2004 |

OTHER PUBLICATIONS

Extended European Search Report dated Mar. 7, 2014 in corresponding European Patent Application No. 12763949.0.

Chinese Office Action dated May 21, 2014 in corresponding Chinese Patent Application No. 201110078367.1.

International Search Report issued Jul. 5, 2012 in corresponding International Patent Application No. PCT/CN2012/073295.

* cited by examiner

METHOD FOR LEARNING MEDIA ACCESS CONTROL ADDRESS, NETWORK DEVICE, AND SYSTEM

This application is a continuation of International Application No. PCT/CN2012/073295, filed on Mar. 30, 2012, which claims priority to Chinese Patent Application No. 201110078367.1, filed on Mar. 30, 2011, both of which are hereby incorporated by reference in their entireties.

TECHNICAL FIELD

The present invention relates to the field of communications, and in particular, to a method for learning a media access control address, a network device, and a system.

BACKGROUND

A media access control (Media Access Control, MAC) address is a unique address assigned to a network device during the delivery, with the length of 48 bits, and is used to identify a network device. Each network device has a unique MAC address.

A process of learning a MAC address by a switch may be specifically as follows: A user sends from port 1 a packet whose source MAC address (Source Address, SA for short) is MAC B, destination MAC address (Destination Address, DA for short) is MAC A, and virtual local area network (Virtual Local Area Network, VLAN for short) is 1; the switch learns the SA of the packet, and establishes a MAC address forwarding table, where the MAC address forwarding table may include such information as SA, VLAN, and port; then the switch may implement unicast forwarding on the packet according to the MAC address forwarding table. Currently, the MAC address forwarding table of the switch is generally stored in a static random access memory (Static Random Access Memory, SRAM for short) or a dynamic random access memory (Dynamic Random Access Memory, DRAM for short). In consideration of capacity and search efficiency, entry storage and search in the MAC address forwarding table generally are implemented by using a Hash algorithm.

The Hash algorithm may establish a many-to-one mapping between a keyword set and a Hash index, that is, one keyword set may only correspond to one Hash index, but one Hash index may correspond to multiple different keyword sets. When different keyword sets correspond to a same Hash index value, a Hash conflict occurs. When a Hash conflict occurs, a corresponding MAC address forwarding table cannot be learned, which causes a forwarding failure and further results in that a user cannot access the Internet or the Internet speed is very low.

SUMMARY

Embodiments of the present invention provide a method for learning a media access control address, a network device, and a system to increase the utilization of a MAC address space and increase the success rate of solving a MAC address conflict.

An embodiment of the present invention provides a method for learning a media access control address, including:
  generating a key value according to a key field of a received packet, and obtaining an index value corresponding to the key value according to the key value;
  performing a linear random iteration on the index value according to a preset number of iterations;
  searching, according to an iteration index value obtained during the first iteration, in a media access control (MAC) address pool for a MAC address corresponding to the iteration index value obtained during the first iteration; and
  if failing to find a MAC address corresponding to the iteration index value obtained during the first iteration in the MAC address pool, determining whether there is still an idle MAC address space in the MAC address pool, and continuing to perform an iteration operation; when the number of iteration operations reaches a preset maximum number of iterations, if still failing to find MAC addresses corresponding to iteration index values obtained during iterations and determining that there is still an idle MAC address space in the MAC address pool, learning a MAC address of the received packet at a position where a first idle MAC address space appears.

An embodiment of the present invention further provides a network device, including:
  a generating module, configured to generate a key value according to a key field of a received packet;
  an obtaining module, configured to obtain an index value corresponding to the key value according to the key value generated by the generating module;
  an iteration module, configured to perform, according to a preset number of iterations, a linear random iteration on the index value obtained by the obtaining module;
  a searching module, configured to search, according to an iteration index value obtained during a first iteration, in a media access control (MAC) address pool for a MAC address corresponding to the iteration index value obtained during the first iteration;
  a determining module, configured to: when the searching module does not find a MAC address corresponding to the iteration index value obtained during the first iteration in the MAC address pool, determine whether there is still an idle MAC address space in the MAC address pool, and instruct the iteration module to continue to perform the iteration operation; and
  a learning module, configured to: when the number of iteration operations reaches a preset maximum number of iterations, if the searching module still fails to find MAC addresses corresponding to iteration index values obtained by the iteration module during iterations in the MAC address pool and the determining module determines that there is still an idle MAC address space in the MAC address pool, learn a MAC address of the received packet at a position where a first idle MAC address space appears in the MAC address pool.

An embodiment of the present invention further provides a communications system, including the foregoing network device and at least one user equipment connected to the foregoing network device.

According to embodiments of the present invention, a network device generates a key value according to a key field of a received packet, obtains an index value corresponding to the key value, performs a linear random iteration on the index value according to a preset number of iterations, searches in a MAC address pool for a MAC address corresponding to an iteration index value obtained during a first iteration, and learns a MAC address of the received packet according to the search result. In the embodiments of the present invention, random distribution of MAC addresses is implemented by using a linear random iteration method, with a flexible and controllable iteration depth, so that a MAC address space may be fully utilized and the problem of MAC address conflicts may be solved to the greatest extent. In addition, hardware does not need to be changed, thereby making it convenient to implement the technical solution provided in the embodiments of the present invention.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
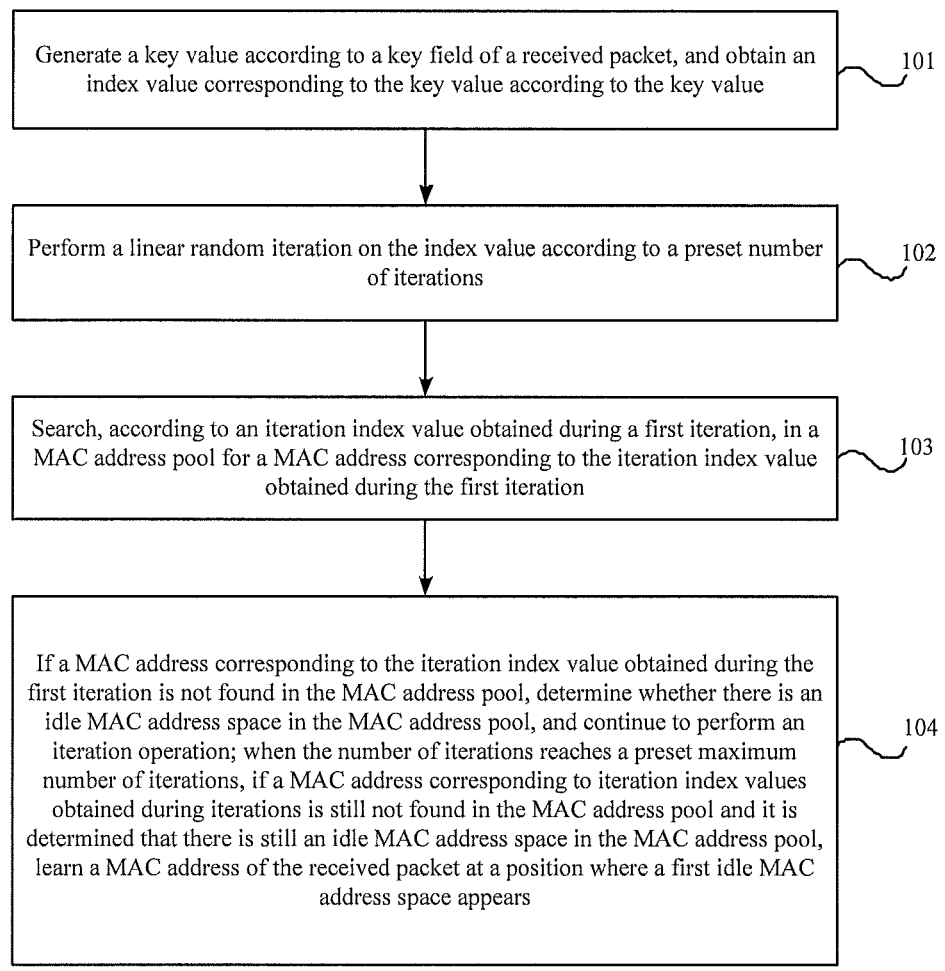
FIG. 1 is a flowchart of an embodiment illustrating a method for learning a media access control address according to the present invention.

FIG. 1 is a flowchart of an embodiment illustrating a method for learning a media access control address according to the present invention. As shown in FIG. 1, the method for learning a media access control address may include:

Step 101: Generate a key value according to a key field of a received packet, and obtain an index value corresponding to the key value according to the key value.

Specifically, the generating a key value according to a key field of a received packet may be as follows: A network device extracts a MAC address and a VLAN from the received packet, and then generates the key value according to the MAC address and/or the VLAN. However, this embodiment is not merely limited to the foregoing. The network device may also generate a key value according to another field, and the mode of generating a key value is not limited in this embodiment.

Specifically, the obtaining an index value corresponding to the key value according to the key value may be as follows: The network device performs a Hash operation on the key value to obtain an index value corresponding to the key value. Certainly, this embodiment is not merely limited to the foregoing. The network device may also perform operation on the key value by using other algorithms so as to obtain an index value corresponding to the key value, which is not limited in this embodiment.

Step 102: Perform a linear random iteration on the index value according to a preset number of iterations.

Step 103: Search, according to an iteration index value obtained during a first iteration, in a MAC address pool for a MAC address corresponding to the iteration index value obtained during the first iteration.

Step 104: If a MAC address corresponding to the iteration index value obtained during the first iteration is not found in the MAC address pool, determine whether there is an idle MAC address space in the MAC address pool, and continue to perform the iteration operation; when the number of iteration operations reaches a preset maximum number of iteration, if MAC addresses corresponding to iteration index values obtained during iterations are still not found in the MAC address pool and it is determined that there is still an idle MAC address space in the MAC address pool, learn a MAC address of the received packet at a position where a first idle MAC address space appears in the MAC address pool.

Further, if a MAC address corresponding to the iteration index value obtained during the first iteration is not found in the MAC address pool and when the number of iteration operations reaches a preset maximum number of iterations, MAC addresses corresponding to iteration index values obtained during iterations are still not found and there is no idle MAC address space in the MAC address pool, a learning failure response is returned.

Further, if a MAC address corresponding to the iteration index value obtained during the first iteration is found in the MAC address pool, a current iteration operation is suspended, and when an entry corresponding to the MAC address needs to be updated, the entry corresponding to the MAC address is updated at the position of learning the MAC address.

In this embodiment, the network device may be a switch or a router, which is not limited in this embodiment.

In the foregoing embodiment, a network device generates a key value according to a key field of a received packet, obtains an index value corresponding to the key value, performs a linear random iteration on the index value according to a preset number of iterations, searches in a MAC address pool for a MAC address corresponding to an iteration index value obtained during a first iteration, and learns a MAC address of the received packet according to the search result. In this embodiment, random distribution of MAC addresses is implemented by using a linear random iteration method, with a flexible and controllable iteration depth, so that a MAC address space may be fully utilized, and the problem of MAC address conflicts may be solved to the greatest extent. In addition, hardware does not need to be changed, thereby making it convenient to implement the method.

Figure 2:
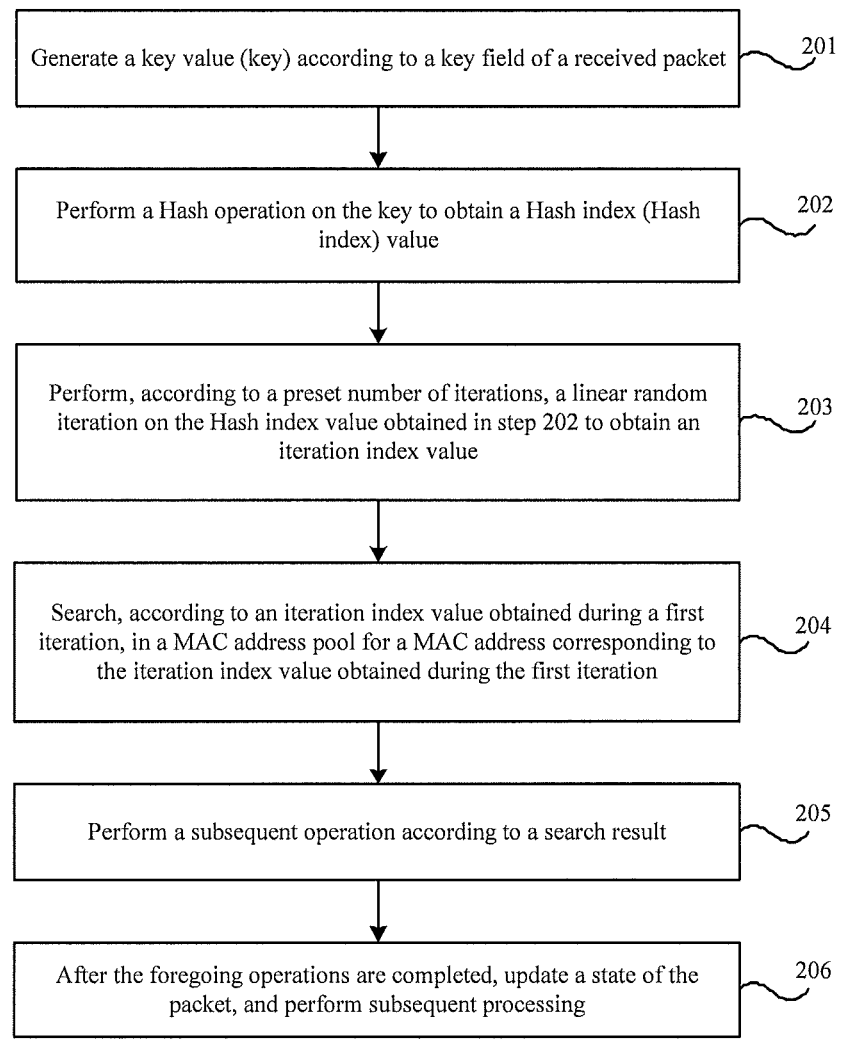
FIG. 2 is a flowchart of another embodiment illustrating a method for learning a media access control address according to the present invention.

FIG. 2 is a flowchart of another embodiment illustrating a method for learning a media access control address according to the present invention. As shown in FIG. 2, the method for learning a media access control address may include:

Step 201: Generate a key value (key) according to a key field of a received packet.

Specifically, for example, the key value may be as follows: key [47:0]=MAC and key [60:48]=VLAN.

Step 202: Perform a Hash operation on the key to obtain a Hash index (Hash index) value.

In this embodiment, the Hash function is generally a CRC32 or a CRC16, where the CRC is short for a cyclical redundancy check (Cyclical Redundancy Check).

For example, for a key with MAC=0x1122334455 and VLAN=10, a CRC32 result thereof is 0x1fe. Because the depth of the actual system is 2k, least 11 bits of the CRC32 result are taken herein. That is, the Hash index value obtained by performing a Hash operation on the key in step 201 is 0x1fe.

Step 203: Perform, according to a preset number of iterations, a linear random iteration on the Hash index value obtained in step 202 to obtain an iteration index value.

This embodiment uses the following linear random iteration algorithm as an example:

Bucket=HashValue (the Hash index value obtained in step 202); (1)

Iter(n times){bucket=(5×bucket)+1+HashValue; HashValue>>=5}; (2)

In the formula (2), Iter(n times) indicates n iterations are performed, where n refers to the preset number of iterations; and bucket indicates an iteration index value obtained in each iteration.

The iteration index value obtained during the first iteration is 0x3f5.

It should be noted that the linear random iteration algorithm selected herein is only an example. During actual implementations, different linear random iteration algorithms may be selected according to different emulations and scenarios, which is not limited in this embodiment.

Step 204: Search, according to the iteration index value obtained during the first iteration, in a MAC address pool for a MAC address corresponding to the iteration index value obtained during the first iteration. In this step, a 0x3f5 MAC address space is searched for whether there is a MAC address corresponding to the iteration index value obtained during the first iteration, where the MAC address space generally stores four or eight MAC addresses.

Step 205: Perform a subsequent operation according to a search result.

Specifically, (1) if a MAC address corresponding to the iteration index value obtained during the first iteration is found in the MAC address pool, a current iteration operation is suspended, and when an entry corresponding to the MAC address needs to be updated, the entry corresponding to the MAC address is updated at the position of learning the MAC address.

(2) If a MAC address corresponding to the iteration index value obtained during the first iteration is not found in the MAC address pool, whether there is an idle MAC address space in the MAC address pool is determined, and an iteration operation continues to be performed; when the number of iteration operations reaches a preset maximum number of iterations, if MAC addresses corresponding to iteration index values obtained during iterations are still not found in the MAC address pool and it is determined that there is still an idle MAC address space in the MAC address pool, a MAC address of the received packet is learned at a position where a first idle MAC address space appears.

(3) If a MAC address corresponding to the iteration index value obtained during the first iteration is not found in the MAC address pool, whether there is an idle MAC address space in the MAC address pool is determined, and an iteration operation continues to be performed; when the number of iteration operations reaches a preset maximum number of iterations, if MAC addresses corresponding to iteration index values obtained during iterations are still not found in the MAC address pool and there is no idle MAC address space in the MAC address pool, a learning failure response is returned.

Step 206: After the foregoing operations are completed, update the state of the packet, and perform subsequent processing.

By using the method for learning a media access control address provided in the embodiment of the present invention, random distribution is performed on a MAC address space to achieve a purpose of reducing MAC address conflicts, with flexible and configurable performance and efficiency as well as extensive applicable scenarios. This method may apply to systems with small-/medium-sized bandwidths, such as a 50 G network processor (Network Processor, NP for short) or a application specific integrated circuit (Application Specific Integrated Circuit, ASIC for short) switching system. Because the switching system emphasizes a MAC address conflict resolution rate, the number of iterations may be set to a larger value; in systems emphasizing wire-speed switching bandwidths, such as a 200 G switching chip, the number of iterations may be set to a smaller value. The number of iterations is set without the need to change hardware, and corresponding configurations need to be performed by using software only. The linear random algorithm used in the embodiment of the present invention may be configured flexibly. In addition, the method provided in the embodiment of the present invention may apply to a system for learning an Internet Protocol (Internet Protocol, IP for short) address that performs address search by using the Hash algorithm. Furthermore, the method provided in the embodiment of the present invention is simple in terms of hardware implementation.

A person of ordinary skill in the art may understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a ROM, a RAM, a magnetic disk, or a compact disk.

Figure 3:
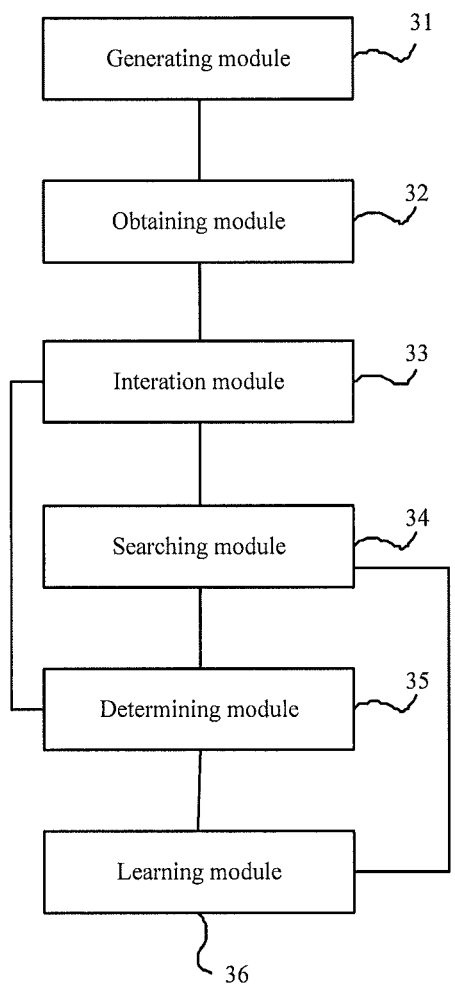
FIG. 3 is a schematic structural diagram of an embodiment illustrating a network device according to the present invention.

FIG. 3 is a schematic structural diagram of an embodiment illustrating a network device according to the present invention. The network device provided in this embodiment may implement the flowchart of the embodiment illustrated in FIG. 1. As shown in FIG. 3, the network device may include:

a generating module 31, configured to generate a key value according to a key field of a received packet;

an obtaining module 32, configured to obtain an index value corresponding to the key value according to the key value generated by the generating module 31; an iteration module 33, configured to perform, according to a preset number of iterations, a linear random iteration on the index value obtained by the obtaining module 32;

a searching module 34, configured to search, according to an iteration index value obtained by the iteration module 33 during a first iteration, in a MAC address pool for a MAC address corresponding to the iteration index value obtained during the first iteration; and a determining module 35, configured to: when the searching module 34 does not find a MAC address corresponding to the iteration index value obtained during the first iteration in the MAC address pool, determine whether there is still an idle MAC address space in the MAC address pool, and instruct the iteration module 33 to continue to perform the iteration operation; and a learning module 36, configured to: when the number of iteration operations reaches a preset maximum number of iterations, if the searching module 34 still fails to find MAC addresses corresponding to iteration index values obtained by the iteration module 33 during iterations in the MAC address pool and the determining module 35 determines that there is still an idle MAC address space in the MAC address pool, learn a MAC address of the received packet at a position where a first idle MAC address space appears in the MAC address pool.

In this embodiment, the network device may be a switch or a router, which is not limited in this embodiment.

In the foregoing embodiment, the generating module 31 generates a key value according to a key field of a received packet; the obtaining module 32 obtains an index value corresponding to the key value; then the iteration module 33 performs a linear random iteration on the index value according to a preset number of iterations; the searching module 34 searches in a MAC address pool for a MAC address corresponding to an iteration index value obtained by the iteration module during a first iteration; finally, the learning module 36 learns a MAC address of the received packet according to the search result of the searching module 34. In this embodiment, random distribution of MAC addresses is implemented by using a linear random iteration method, with a flexible and controllable iteration depth, so that a MAC address space may be fully utilized, and the problem of MAC address conflicts may be solved to the greatest extent. In addition, hardware does not need to be changed, thereby making it convenient to implement the network device.

Figure 4:
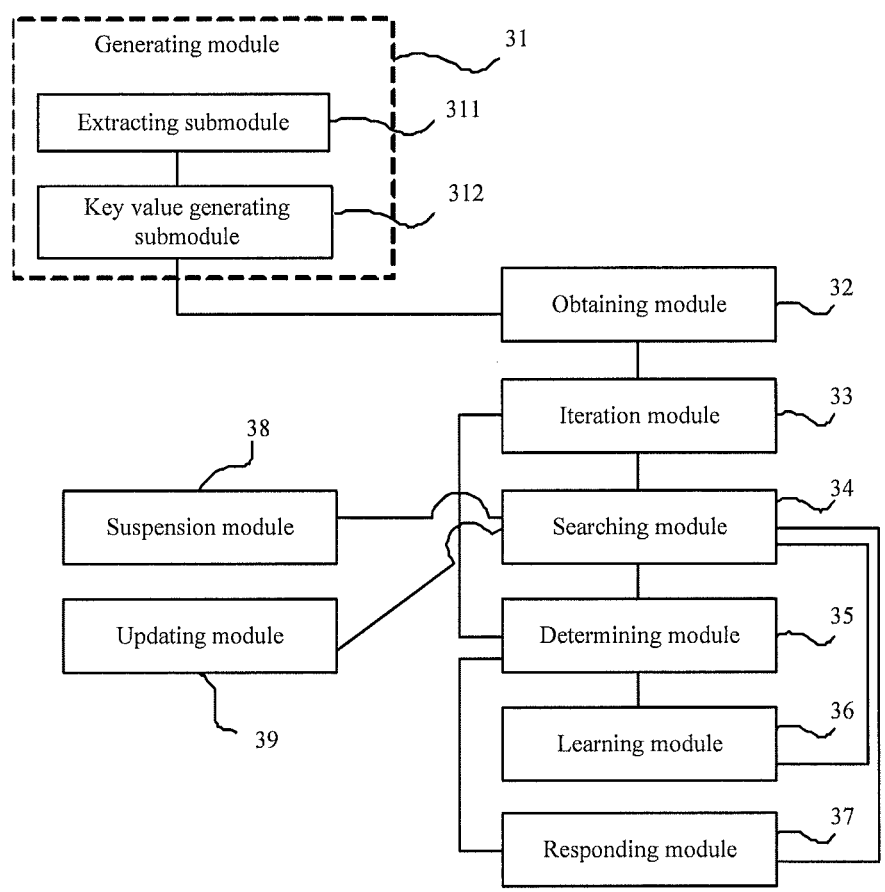
FIG. 4 is a schematic structural diagram of another embodiment illustrating a network device according to the present invention.

FIG. 4 is a schematic structural diagram of another embodiment illustrating a network device. Compared with the network device illustrated in FIG. 3, the network device illustrated in FIG. 4 may further include:
  a responding module, configured to: if the searching module 34 fails to find a MAC address corresponding to the iteration index value obtained during the first iteration in the MAC address pool and when the number of iteration operations reaches a preset maximum number of iterations, if the searching module 34 still fails to find a MAC address corresponding to an iteration index value obtained by the iteration module 33 during iterations in the MAC address pool and the determining module 35 determines that there is no idle MAC address space in the MAC address pool, return a learning failure response;
  a suspension module 38, configured to suspend a current iteration operation when the searching module 34 does not find a MAC address corresponding to the iteration index value obtained during the first iteration in the MAC address pool; and
  an updating module 39, configured to: when an entry corresponding to the MAC address needs to be updated, update the entry corresponding to the MAC address at a position of learning the MAC address.

In this embodiment, the generating module 31 may include:
  an extracting submodule 311, configured to extract a MAC address and a VLAN from the received packet; and
  a key value generating submodule 312, configured to generate the foregoing key value according to the MAC address and/or the VLAN extracted by the extracting submodule 311. However, this embodiment is not merely limited to the foregoing. The key value generating submodule 312 may also generate the foregoing key value according to another field extracted by the extracting submodule 311. This embodiment does not limit the mode of generating the key value.

Specifically, in this embodiment, the obtaining module 32 may perform a Hash operation on the foregoing key value to obtain an index value corresponding to the key value. Certainly, this embodiment is not merely limited to the foregoing. The obtaining module 32 may also perform operation on the key value by using other algorithms to obtain an index value corresponding to the key value, which is not limited in this embodiment.

The foregoing network device implements random distribution of MAC addresses by using a linear random iteration method, so that a MAC address space may be fully utilized and the problem of MAC address conflicts may be solved to the greatest extent.

Figure 5:
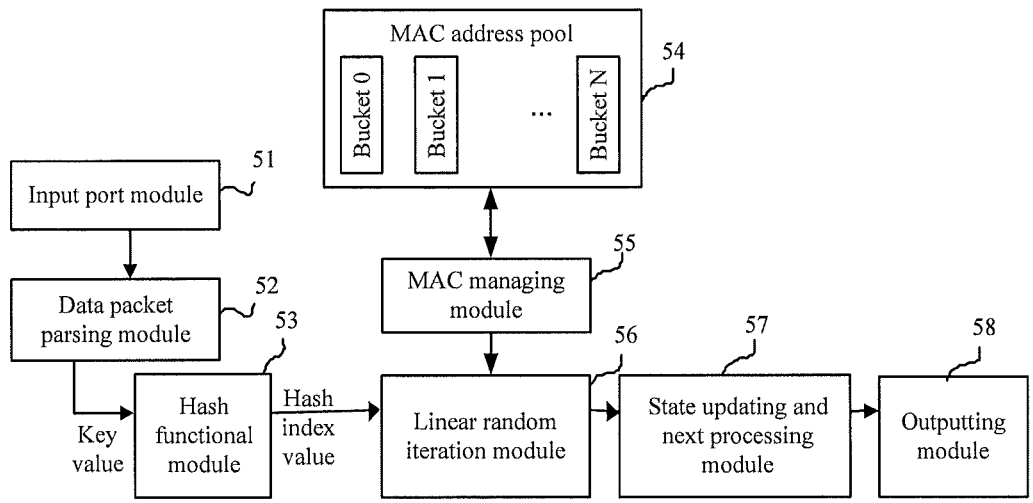
FIG. 5 is a schematic structural diagram of another embodiment illustrating a network device according to the present invention.

FIG. 5 is a schematic structural diagram of another embodiment illustrating a network device according to the present invention. As shown in FIG. 5, the network device may include an input port module 51, a data packet parsing module 52, a Hash function module 53, a MAC address pool 54, a MAC managing module 55, a linear random iteration module 56, a state updating and next processing module 57, and an outputting module 58.

The input port module 51 is configured to receive a packet from a user, and perform a corresponding validity check on the received packet.

The data packet parsing module 52 is configured to parse the packet received by the input port module 51 to determine a packet type and extract a key field of the packet, such as a MAC address, a VLAN, an IP address, a port, and the like, and generate a key value according to the extracted a key field. This module implements the functions of the generating module 31 in the embodiment illustrated in FIG. 3, and the extracting submodule 311 and the key value generating submodule 312 in the embodiment illustrated in FIG. 4.

The Hash function module 53 is configured to perform a Hash operation on the key value generated by the data packet parsing module 52 to obtain a Hash index value. This module implements the functions of the obtaining module 32 in the embodiments illustrated in FIG. 3 and FIG. 4. The Hash function may use a CRC32 or a CRC16, which is not limited in this embodiment.

The MAC address pool 54 is configured to store MAC addresses. The MAC address pool 54 involves a concept of bucket depth, where the bucket depth refers to a maximum number of MAC addresses that can be stored corresponding to the same Hash index value. The selection of bucket depth needs to consider such factors as search efficiency and conflict rate. The deeper the bucket, the more comparisons are needed during the learning and searching of a MAC address, which affects the forwarding performance of the entire system. The shallower the bucket is, the higher the probability of the occurrence of a conflict is during the learning of a MAC address. Therefore, in a practical application, the bucket depth is generally 8 or 4.

The linear random iteration module 56 is configured to perform, according to a preset number of iterations, iteration on the Hash index value obtained by the Hash function module 53 by using a linear random algorithm to obtain an iteration index value. This module implements the functions of the iteration module 33 and the learning module 36 in the embodiments illustrated in FIG. 3 and FIG. 4 and the functions of the responding module 37, the suspension module 38, and the updating module 39 in the embodiment illustrated in FIG. 4.

The MAC managing module 55 is configured to search, according to iteration index values obtained by the linear random iteration module 56 each time, in the MAC address pool 54 for MAC addresses corresponding to the iteration index values, and return the search results to the linear random iteration module 56. This module implements the functions of the searching module 34 and the determining module 35 in the embodiments illustrated in FIG. 3 and FIG. 4.

Specifically, if the MAC managing module 55 finds a MAC address corresponding to an iteration index value obtained by the linear random iteration module 56 during a first iteration in the MAC address pool, the linear random iteration module 56 may suspend a current iteration operation; when an entry corresponding to the found MAC address needs to be updated, the linear random iteration module updates the entry corresponding to the MAC address at the position of learning the MAC address;

if failing to find a MAC address corresponding to an iteration index value obtained by the linear random iteration module 56 during the first iteration in the MAC address pool, the MAC managing module 55 determines whether there is still an idle MAC address space in the MAC address pool, and instructs the linear random iteration module 56 to continue to perform the iteration operation; when the number of iteration operations reaches a preset maximum number of iterations, if the MAC managing module 55 still fails to find MAC addresses corresponding to iteration index values obtained during iterations in the MAC address pool and determines that there is still an idle MAC address space in the MAC address pool, the linear random iteration module 56 learns a MAC address of the received packet at a position where a first idle MAC address space appears in the MAC address pool; or if failing to find a MAC address corresponding to the iteration index value obtained by the linear random iteration module 56 during the first iteration in the MAC address pool, the MAC managing module 55 determines whether there is still an idle MAC address space in the MAC address pool, and instructs the linear random iteration module 56 to continue to perform the iteration operation; when the number of iteration operations reaches a preset maximum number of iterations, if the MAC managing module 55 still fails to find MAC addresses corresponding to the iteration index values obtained during iterations in the MAC address pool and there is no idle MAC address space in the MAC address pool, the linear random iteration module 56 returns a learning failure response.

The state updating and next processing module 57 is configured to update a state of the packet and perform subsequent processing after the operation of the linear random iteration module 56 is completed.

The outputting module 58 is configured to output a packet processed by the state updating and next processing module 57.

By using the foregoing network device, random distribution is performed on a MAC address space to achieve a purpose of reducing MAC address conflicts, with simple hardware implementation mode, flexible and configurable performance and efficiency, as well as extensive applicable scenarios. This network device may apply to systems with small-/medium-sized bandwidths, such as a 50 G NP or an ASIC switching system. Because the switching system emphasizes a MAC address conflict resolution rate, the number of iterations may be set to a larger value; in systems emphasizing wire-speed switching bandwidths, such as a 200 G switching chip, the number of iterations may be set to a smaller value. The number of iterations is set without the need to change hardware, and corresponding configurations need to be performed by using software only. The linear random algorithm used in this embodiment may be configured flexibly. In addition, the network device provided in this embodiment may apply to a system for learning an IP address that performs address search by using the Hash algorithm.

Figure 6:
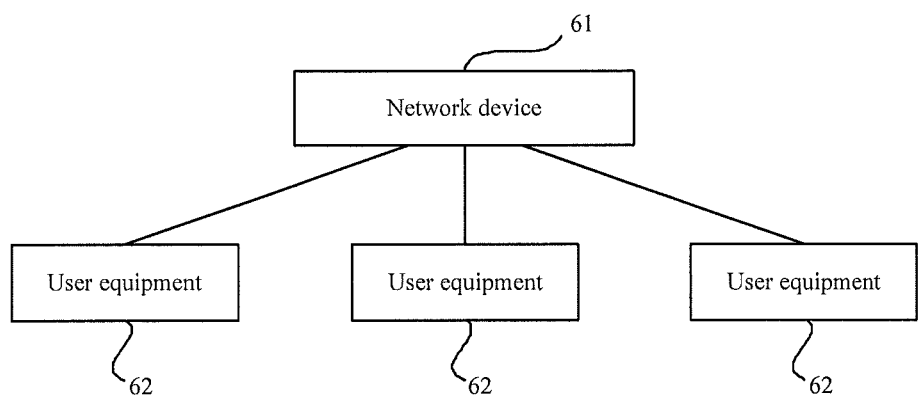
FIG. 6 is a schematic structural diagram of an embodiment illustrating a communications system according to the present invention.

FIG. 6 is a schematic structural diagram of an embodiment illustrating a communications system according to the present invention. As shown in FIG. 6, the communications system may include a network device 61 and at least one user equipment 62 connected to the network device 61.

In this embodiment, the user equipment 62 may send a packet to the network device 61.

The network device 61 is configured to: receive a packet from the user equipment 62, generate a key value according to a key field of the received packet, and obtain an index value corresponding to the key value according to the key value; perform a linear random iteration on the index value according to a preset number of iterations; search, according to an iteration index value obtained during a first iteration, in a MAC address pool for a MAC address corresponding to the iteration index value obtained during the first iteration; if failing to find a MAC address corresponding to the iteration index value obtained during the first iteration in the MAC address pool, determine whether there is still a MAC address space in the MAC address pool, and continue to perform the iteration operation; when the number of iteration operations reaches a preset maximum number of iterations, if still failing to find MAC addresses corresponding to iteration index values obtained during iterations in the MAC address pool and determining that there is still an idle MAC address space in the MAC address pool, learn a MAC address of the received packet at a position where a first idle MAC address space appears in the MAC address pool. Specifically, the network device 61 may be implemented by using the network device provided in the embodiments illustrated in FIG. 3, FIG. 4 or FIG. 5, and the network device 61 may be a switch or a router, which is not limited in this embodiment.

In this embodiment, for details about interactions between the network device 61 and the user equipment 62, reference may be made to the descriptions of the method embodiment of the present invention, which is not further described herein.

The foregoing system implements random distribution of MAC addresses by using a linear random iteration method, with a flexible and controllable iteration depth, so that a MAC address space may be fully utilized and the problem of MAC address conflicts is solved to the greatest extent. In addition, hardware does not need to be changed, thereby making it convenient to implement the system.

It should be understood by persons skilled in the art that the accompanying drawings are merely schematic diagrams of an exemplary embodiment, and modules or processes in the accompanying drawings are not necessarily required in implementing the present invention.

A person of ordinary skill in the art may understand that the modules in the devices provided in the embodiments may be arranged in the devices in a distributed manner according to the description of the embodiments, or may be arranged in one or more devices which are different from those described in the embodiments. The modules according to the above embodiments may be combined into one module, or split into multiple submodules.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A method of learning a media access control (MAC) address for a network device, comprising:
   performing by the network device:
   generating a key value according to a key field of a received packet, and obtaining an index value corresponding to the key value according to the key value;
   performing a linear random iteration on the index value according to a preset number of iterations to obtain an iteration index value;
   searching, according to the iteration index value obtained during a first iteration, in a MAC address pool for a MAC address corresponding to the iteration index value obtained during the first iteration;
   if failing to find a MAC address corresponding to the iteration index value obtained during the first iteration in the MAC address pool, determining whether there is still an idle MAC address space in the MAC address pool, and continuing to perform another iteration; and
   when number of iterations reach a preset maximum number of iterations, if still failing to find MAC addresses corresponding to iteration index values obtained during iterations and determining that there is still an idle MAC address space in the MAC address pool, learning a MAC address of the received packet at a position where a first idle MAC address space appears.

2. The method according to claim 1, further comprising:
   if failing to find a MAC address corresponding to the iteration index value obtained during the first iteration in the MAC address pool and when the number of iterations reach the preset maximum number of iterations, if still failing to find MAC addresses corresponding to iteration index values obtained during iterations and there is no idle MAC address space in the MAC address pool, returning a learning failure response.

3. The method according to claim 1, further comprising:
   if finding a MAC address corresponding to the iteration index value obtained during the first iteration in the MAC address pool, suspending a current iteration, and when an entry corresponding to the MAC address needs to be updated, updating the entry corresponding to the MAC address at the position of learning the MAC address.

4. The method according to claim 1, wherein the generating a key value according to a key field of a received packet comprises:
   extracting a MAC address and a virtual local area network from the received packet; and
   generating the key value according to the MAC address and/or the virtual local area network.

5. The method according to claim 1, wherein the obtaining an index value corresponding to the key value according to the key value comprises:
   performing a Hash operation on the key value to obtain an index value corresponding to the key value.

6. A network device, comprising:
   a non-transitory computer-readable medium to store computer program codes, and
   computer hardware configured, including configured by the programs, to implement:
   a generating module, configured to generate a key value according to a key field of a received packet;
   an obtaining module, configured to obtain an index value corresponding to the key value according to the key value generated by the generating module;
   an iteration module, configured to perform, according to a preset number of iterations, a linear random iteration on the index value obtained by the obtaining module to obtain an iteration index value;
   a searching module, configured to search, according to the iteration index value obtained during a first iteration, in a media access control (MAC) address pool for a MAC address corresponding to the iteration index value obtained during the first iteration;
   a determining module, configured to: when the searching module does not find a MAC address corresponding to the iteration index value obtained during the first iteration in the MAC address pool, determine whether there is still an idle MAC address space in the MAC address pool, and instruct the iteration module to continue to perform another iteration; and
   a learning module, configured to: when number of iterations reach a preset maximum number of iterations, if the searching module still fails to find MAC addresses corresponding to iteration index values obtained by the iteration module during iterations in the MAC address pool and the determining module determines that there is still an idle MAC address space in the MAC address pool, learn a MAC address of the received packet at a position where a first idle MAC address space appears in the MAC address pool.

7. The network device according to claim 6, further comprising:
   a responding module, configured to: if the searching module fails to find a MAC address corresponding to the iteration index value obtained during the first iteration in the MAC address pool and when the number of iterations reach the preset maximum number of iterations, if the searching module still fails to find a MAC address corresponding to an iteration index value obtained by the iteration module in the MAC address pool and the determining module determines that there is no idle MAC address space in the MAC address pool, return a learning failure response.

8. The network device according to claim 6, further comprising:
   a suspension module, configured to suspend a current iteration when the searching module does not find a MAC address corresponding to the iteration index value obtained during the first iteration in the MAC address pool; and
   an updating module, configured to: when an entry corresponding to the MAC address needs to be updated, update the entry corresponding to the MAC address at a position of learning the MAC address.

9. The network device according to claim 6, wherein the generating module comprises:
   an extracting submodule, configured to extract a MAC address and a virtual local area network from the received packet; and
   a key value generating submodule, configured to generate the key value according to the MAC address and/or the virtual local area network extracted by the extracting submodule.

10. The network device according to claim 6, wherein:
    the obtaining module is specifically configured to perform a Hash operation on the key value to obtain an index value corresponding to the key value.

11. A non-transitory computer readable medium storing, comprising computer program code which when executed cause the computer to perform:

generating a key value according to a key field of a received packet, and obtaining an index value corresponding to the key value according to the key value;

performing a linear random iteration on the index value according to a preset number of iterations to obtain an iteration index value;

searching, according to the iteration index value obtained during a first iteration, in a MAC address pool for a MAC address corresponding to the iteration index value obtained during the first iteration;

if failing to find a MAC address corresponding to the iteration index value obtained during the first iteration in the MAC address pool, determining whether there is still an idle MAC address space in the MAC address pool, and continuing to perform another iteration; and when number of iterations reach a preset maximum number of iterations, if still failing to find MAC addresses corresponding to iteration index values obtained during iterations and determining that there is still an idle MAC address space in the MAC address pool, learning a MAC address of the received packet at a position where a first idle MAC address space appears.

* * * * *